US008804152B2

(12) United States Patent
Komiya

(10) Patent No.: US 8,804,152 B2
(45) Date of Patent: Aug. 12, 2014

(54) IMAGE FORMING APPARATUS WITH COPY RESTRICTION FUNCTION

(75) Inventor: Yoshiyuki Komiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1643 days.

(21) Appl. No.: 11/756,302

(22) Filed: May 31, 2007

(65) Prior Publication Data

US 2008/0018942 A1 Jan. 24, 2008

(30) Foreign Application Priority Data

Jun. 23, 2006 (JP) ................................. 2006-174141

(51) Int. Cl.
*G06K 15/00* (2006.01)

(52) U.S. Cl.
USPC ........................... 358/1.14; 358/1.9; 358/3.28

(58) Field of Classification Search
USPC ......................................... 358/1.14, 1.9, 1.15
See application file for complete search history.

(56) References Cited

U.S. PATENT DOCUMENTS

2003/0179399 A1* 9/2003 Matsunoshita .............. 358/1.13
2005/0135856 A1* 6/2005 Uchida et al. ................. 399/411
2006/0279785 A1* 12/2006 Onishi et al. ................. 358/1.18

FOREIGN PATENT DOCUMENTS

JP 2000-184178 A 6/2000

OTHER PUBLICATIONS

English translation, JP2000-184178, Jun. 30, 2000.*

* cited by examiner

*Primary Examiner* — King Poon
*Assistant Examiner* — Iriana Cruz
(74) *Attorney, Agent, or Firm* — Canon USA, Inc. IP Division

(57) ABSTRACT

A method for an image forming apparatus includes scanning a document containing a copy-forgery-inhibited pattern having a latent-image part to be highlighted when the copy-forgery-inhibited pattern is copied and copy restriction information for restricting the number of times of copying, decoding the copy restriction information contained in the document image scanned, removing the copy-forgery-inhibited pattern from the document image scanned, updating the decoded copy restriction information, and forming, on a sheet, the updated copy restriction information with the image which the copy-forgery-inhibited pattern has been removed from the document image.

6 Claims, 17 Drawing Sheets

IMAGE FORMING APPARATUS WITH COPY RESTRICTION FUNCTION

BACKGROUND OF THE INVENTION

1. Field of the Invention

The present invention relates to an image forming apparatus capable of restricting copying of a document.

2. Description of the Related Art

In offices and the like, a document printed by a printer is often copied by a copying machine. This may, however, cause serious security problems. For example, if copies of a confidential document distributed at a meeting or the like are made, it is likely that these copies will fall into the hands of third parties.

FIG. 18 and FIG. 19 illustrate exemplary techniques widely used to prevent such a problem. Referring to FIG. 18, an output document contains a warning message indicating that copying is not permitted. FIG. 19 illustrates a technique in which invisible marks that have been recorded, using a special sheet or ink, on a document to be copied are made visible when a copy of this document is output.

However, even if a copy-protection warning is added to a document as illustrated in FIG. 18, it is possible to ignore the warning and make a copy of the document. Therefore, the technique illustrated in FIG. 18 has only a limited effect on copy protection.

The technique illustrated in FIG. 19 involves the use of special consumable items (such as sheets or ink) and a printing apparatus required for using them. This leads to a problem of increased cost.

FIG. 20 illustrates a technique used in recent years. In this technique, a copy-forgery-inhibited pattern or watermark is added in advance to part or the entire surface of an output document. Then, if the output document with a copy-forgery-inhibited pattern or watermark is copied, it can be visually recognized that the resulting material is a copy of the output document. There is also a proposed apparatus which provides a mechanism for shading the entire surface of such a copy.

Additionally, there is a need for a copy restriction method which permits copying of a document a limited number of times, instead of totally inhibiting copying.

In response to such a need, there has been proposed a technique in which a "first-generation-copying inhibiting mark" for inhibiting copying of a document or a "second-generation-copying inhibiting mark" for inhibiting copying of a copy of a document is added in advance as image information to the document, which is then output. If the first-generation-copying inhibiting mark is detected when the output document is scanned, the scanned image of the document is removed. On the other hand, if the second-generation-copying inhibiting mark is detected when the output document is scanned, the second-generation-copying inhibiting mark is removed and a first-generation-copying inhibiting mark is newly added to the scanned image, which is then output (e.g., see, Japanese Patent Laid-Open No. 2000-184178).

The invention disclosed in Japanese Patent Laid-Open No. 2000-184178 is effective, as illustrated in FIG. 17, in permitting up to predetermined-generation copying and inhibiting further-generation copying.

The invention disclosed in Japanese Patent Laid-Open No. 2000-184178 is effective when applied to an operating environment, such as an office, where only copying machines with the above-described configuration are used. However, in an operating environment where copying machines which do not have the above-described configuration are also used, it is difficult to ensure information security, since such copying machines do not support the copy restriction function described above.

In other words, the invention disclosed in Japanese Patent Laid-Open No. 2000-184178 is effective in preventing information leaking where only copying machines with the copy restriction function are used, but reduces its practical effects by half in an operating environment where copying machines which do not support the copy restriction function are also used.

SUMMARY OF THE INVENTION

The present invention provides an image forming apparatus and method to address the issues described above.

The present invention also provides an image forming apparatus and method that enable effective use of a copy restriction function even in an environment where copying machines with and without the copy restriction function are both used.

The present invention further provides an image forming apparatus and method that enable copy restrictions in an environment where copying machines which support the copy restriction function are present while maintaining a copy-protection effect in an environment where typical copying machines which do not support the copy restriction function are present.

According to an aspect of the present invention, a method for controlling an image forming apparatus includes: reading an original image to which a copy-forgery-inhibited pattern and copy restriction information for restricting a number of times of copying are added, the copy-forgery-inhibited pattern including a latent-image part and background-image part, when the copy-forgery-inhibited pattern is copied, the latent-image part in the copy-forgery-inhibited pattern appears in the copied image; determining the copy restriction information read from the original image; removing the copy-forgery-inhibited pattern from the original image; updating the copy restriction information; and forming, on a sheet, the copy restriction information with the image from which the copy-forgery-inhibited pattern has been removed from the original image.

Further features of the present invention will become apparent from the following description of exemplary embodiments with reference to the attached drawings.

DESCRIPTION OF THE EMBODIMENTS

Exemplary embodiments of the present invention will now be described with reference to the drawings.

Figure 1:
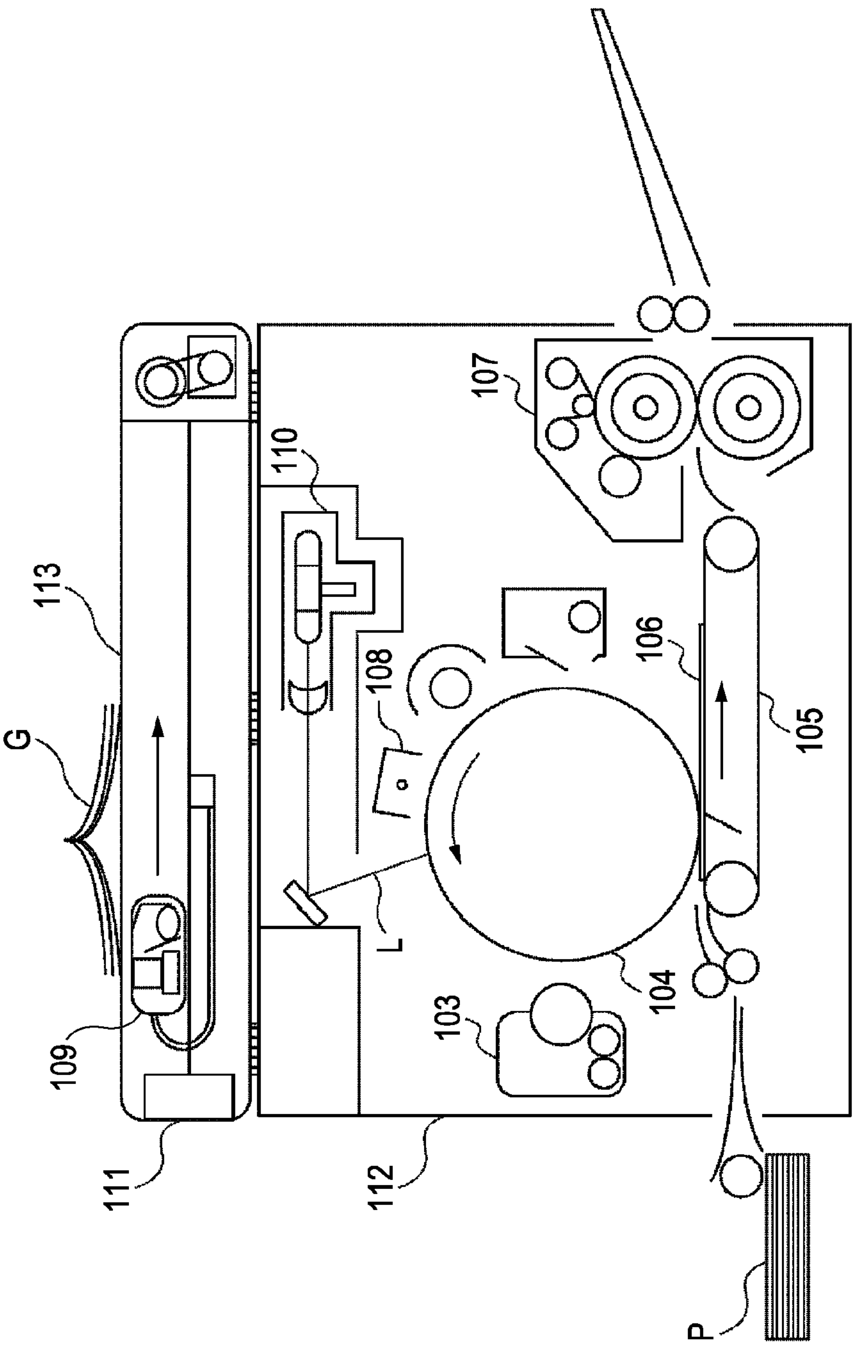
FIG. 1 is a cross-sectional view of a copying machine to which the present invention is applicable.

FIG. 1 is a cross-sectional view of an image forming apparatus according to an exemplary embodiment of the present invention. In the exemplary embodiment, a digital multifunction product having functions of a copier, printer, facsimile, and the like will be described as an example of the image forming apparatus.

A scanner (scanning device) 111 scans an image of a document G. A printer (image forming device) 112 forms an image on a recording sheet. The document G is placed on an original plate 113. An optical system 109 for scanning the document G includes a lamp for illuminating the document G, a short focus lens array, and a charge-coupled device (CCD) sensor or contact image sensor (CIS) serving as a scanning element. By scanning while illuminating the document G with the lamp, a light beam reflected off the surface of the document G is focused by the short focus lens array and is incident on the CCD sensor.

The CCD sensor includes a CCD photo detector (not shown), a transmitting unit (not shown), and an output unit (not shown). A light signal is converted by the CCD photo detector into a charge signal and sequentially transmitted by the transmitting unit to the output unit in synchronization with clock pulses. The output unit converts the charge signal into a voltage signal, amplifies the voltage signal, reduces its impedance, and outputs the signal. The resulting analog signal is subjected to known image processing, converted into a digital signal, and transmitted to the printer 112.

When a start key (not shown) of an operation unit is pressed, a photosensitive drum 104 is charged by a charger 108 to a predetermined potential. In a laser exposure unit 110 of the printer 112, a solid laser element emits light L on the basis of the digital signal described above. The emitted light L scans the surface of the photosensitive drum 104 through a rotatable polygon mirror rotating at a high speed. This allows an electrostatic latent image corresponding to the document image to be formed on the surface of the photosensitive drum 104. This electrostatic latent image is developed by a developing unit 103 into a toner image on the surface of the photosensitive drum 104. The developing unit 103 stores a so-called two-component toner composed of toner particles and carrier particles. The toner image formed on the surface of the photosensitive drum 104 is transferred by a transfer unit 105 onto a transfer member 106, which is then separated from the photosensitive drum 104 and conveyed to a fixing unit 107. The transfer member 106 is subjected to thermal fixing in the fixing unit 107 and discharged.

Figure 2:
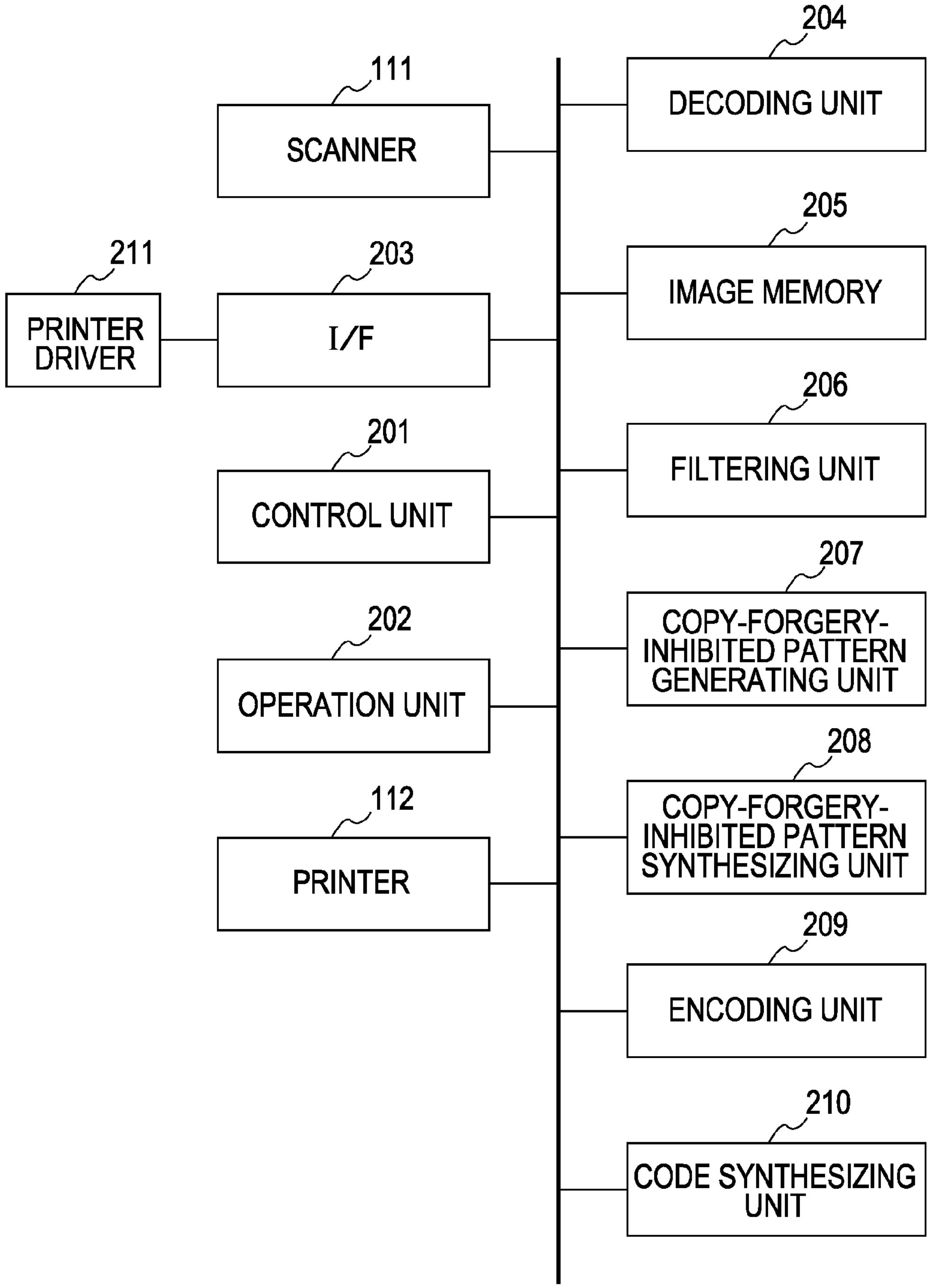
FIG. 2 is a block diagram illustrating an exemplary configuration of an image forming apparatus.

FIG. 2 is a block diagram illustrating an exemplary configuration of the image forming apparatus.

A control unit 201 controls the overall operation of the image forming apparatus. An operation unit 202 is used for making various settings and displaying information. An interface (I/F) 203 communicates with other devices connected to a network. A printer driver 211 performs processing for printing on a personal computer (PC) connected to the network. A decoding unit 204 decodes a code mark (described below) added to a document (or original). An image memory 205 stores images received by the interface 203 and images scanned by the scanner 111. A filtering unit 206 performs various types of image processing, including copy-forgery-inhibited-pattern removal processing (described below), on image data. A copy-forgery-inhibited-pattern generating unit 207 generates an image of a copy-forgery-inhibited pattern to be added to a print image. A copy-forgery-inhibited-pattern synthesizing unit 208 synthesizes a generated copy-forgery-inhibited pattern as a pattern to be added with an image to be printed. An encoding unit 209 encodes copy restriction information (described below) into a code mark, such as a barcode. A code synthesizing unit 210 synthesizes a code mark with an image to be printed.

Next, a method for adding a typical copy-forgery-inhibited pattern to an image formed on the transfer member 106 will be described.

Data of a document created on the PC is transmitted through the printer driver 211 and stored in the image memory 205. If the user specifies that a copy-forgery-inhibited pattern be added, the printer driver 211 transmits copy-forgery-inhibited-pattern addition information to the copy-forgery-inhibited-pattern generating unit 207. Then, the copy-forgery-inhibited-pattern synthesizing unit 208 adds an image of a generated copy-forgery-inhibited pattern to an image read from the image memory 205 and transmits the resulting image data to the printer 112.

Next, a process of copying a document image will be described.

A document image scanned by the scanner 111 is stored in the image memory 205, subjected to image processing, such as edge enhancement, masking, or the like by the filtering unit 206, and transmitted to the printer 112.

Figure 3:
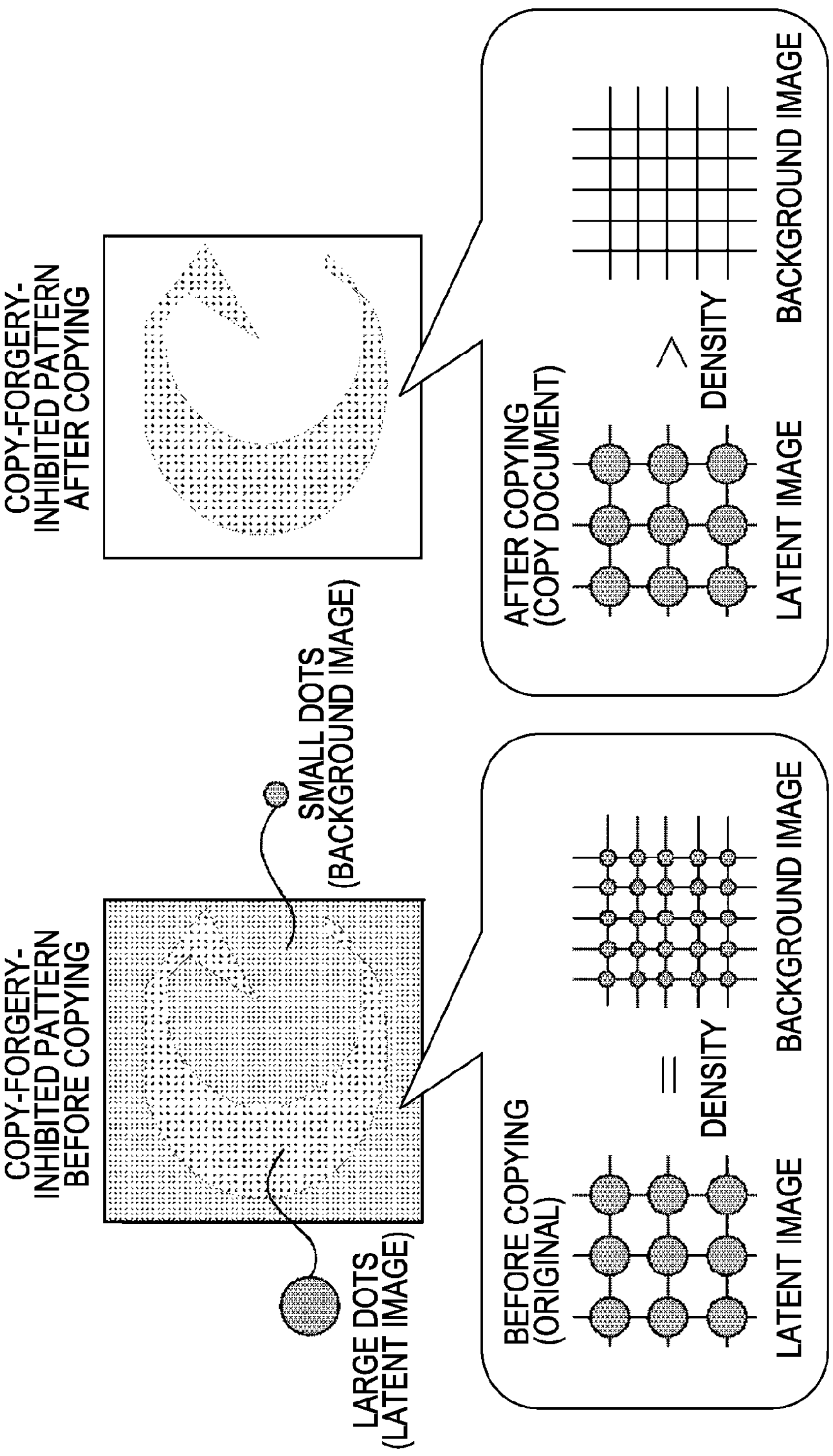
FIG. 3 is a diagram illustrating a composition of a copy-forgery-inhibited pattern.

A composition of a copy-forgery-inhibited pattern will be described with reference to FIG. 3. An exemplary copy-forgery-inhibited pattern illustrated in FIG. 3 is composed of a background image part (having small dots) and a latent image part (having large dots) that are formed, using the limit of image reproduction capability of the image forming apparatus, by arrays of pixels of different sizes. Generally, the background is a portion where pixels disappear after copying due to the limit of reproduction capability of the scanner 111 or printer 112, while the latent image is a portion where pixels are reproduced without disappearing after copying. When a copy-forgery-inhibited pattern is copied, a predetermined picture (i.e., latent image) in the copied image is highlighted. Typical examples of the predetermined picture include a copy-protection warning and a phrase indicating that the material is a copy.

The size and arrangement of pixels in the background and latent image in the copy-forgery-inhibited pattern described above are determined according to the image reproduction capability of the scanner 111 or printer 112.

In the present exemplary embodiment, patterns in the copy-forgery-inhibited pattern are different from a pattern for halftone representation (e.g., dithering) of an image formed before addition of the copy-forgery-inhibited pattern. That is, the patterns of the background and latent image are designed specifically for the copy-forgery-inhibited pattern.

Next, a process of printing a copy-forgery-inhibited pattern will be described with reference to the flowchart of FIG. 4.

A document created on the PC or the like is converted through the printer driver 211 into data for printing and is stored in the image memory 205.

Figure 5:
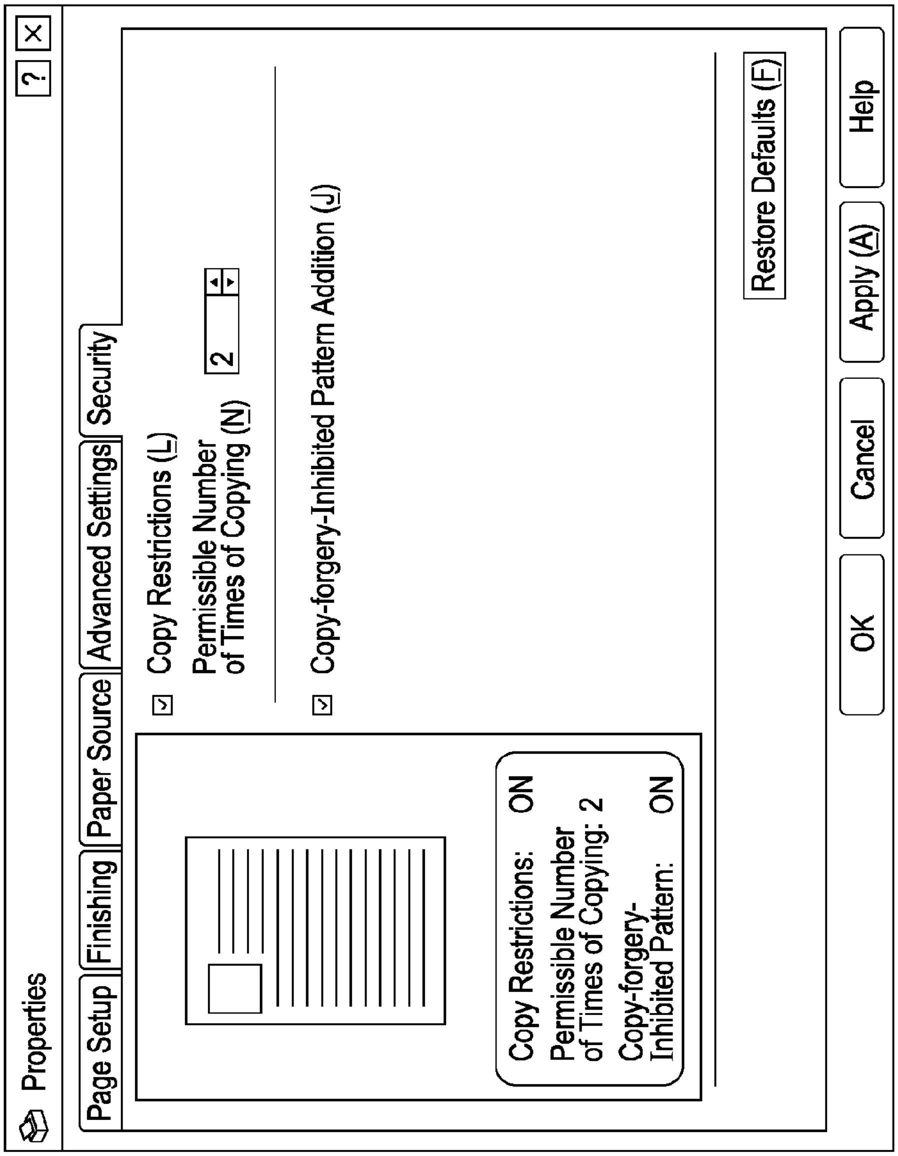
FIG. 5 illustrates an exemplary screen of a printer driver.

FIG. 5 illustrates an exemplary screen of the printer driver 211. When giving an instruction to perform printing, the user specifies various output settings and the like on this screen through the PC. When a document to be output is a confidential document, the user can specify, on the screen of the printer driver 211, the setting of copy restrictions, that is, the permissible number of times of copying "n" of this document. Additionally, the user can specify whether to add a copy-forgery-inhibited pattern to this document. In the present exemplary embodiment, a copy-forgery-inhibited pattern is configured to be automatically added to the document if it is specified that copying of the document is to be restricted. In the example of FIG. 5, the permissible number of times of copying is two.

Figure 4:
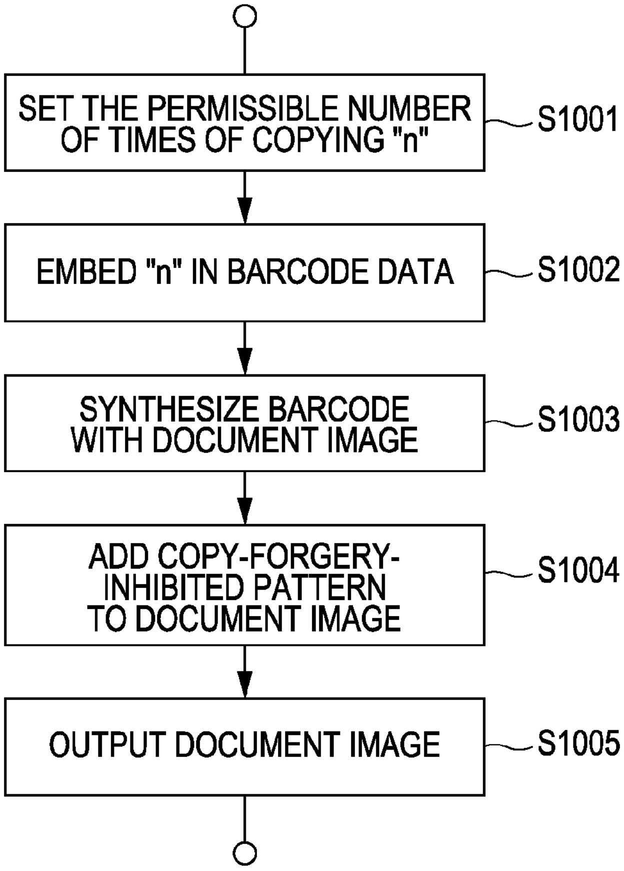
FIG. 4 is a flowchart illustrating a printing process for adding copy restriction information.

Referring to FIG. 4, when the above-described settings are made in the printer driver 211 (step S1001), the printer driver 211 transmits information as to whether to place copy restrictions and the permissible number of times of copying "n" to the encoding unit 209, while transmitting copy-forgery-inhibited-pattern addition information to the copy-forgery-inhibited-pattern generating unit 207.

The encoding unit 209 will now be described in detail. In the encoding unit 209, the information as to whether to place copy restrictions and the permissible number of times of copying "n" are encoded and converted into a mark (i.e., code mark) (step S1002). Examples of this code mark include a one-dimensional barcode widely used for general purposes and a two-dimensional barcode having been widespread in recent years. Information to be encoded may include not only the setting of copy restrictions and the permissible number of times of copying, but also the name and affiliate of a person (preparer) who prepared a document to be output, a device number of a printer from which the document is to be output, and the date and time of output (or printing). As the number of items of information to be encoded increases, protection against leakage of confidential information is enhanced.

Figure 6:
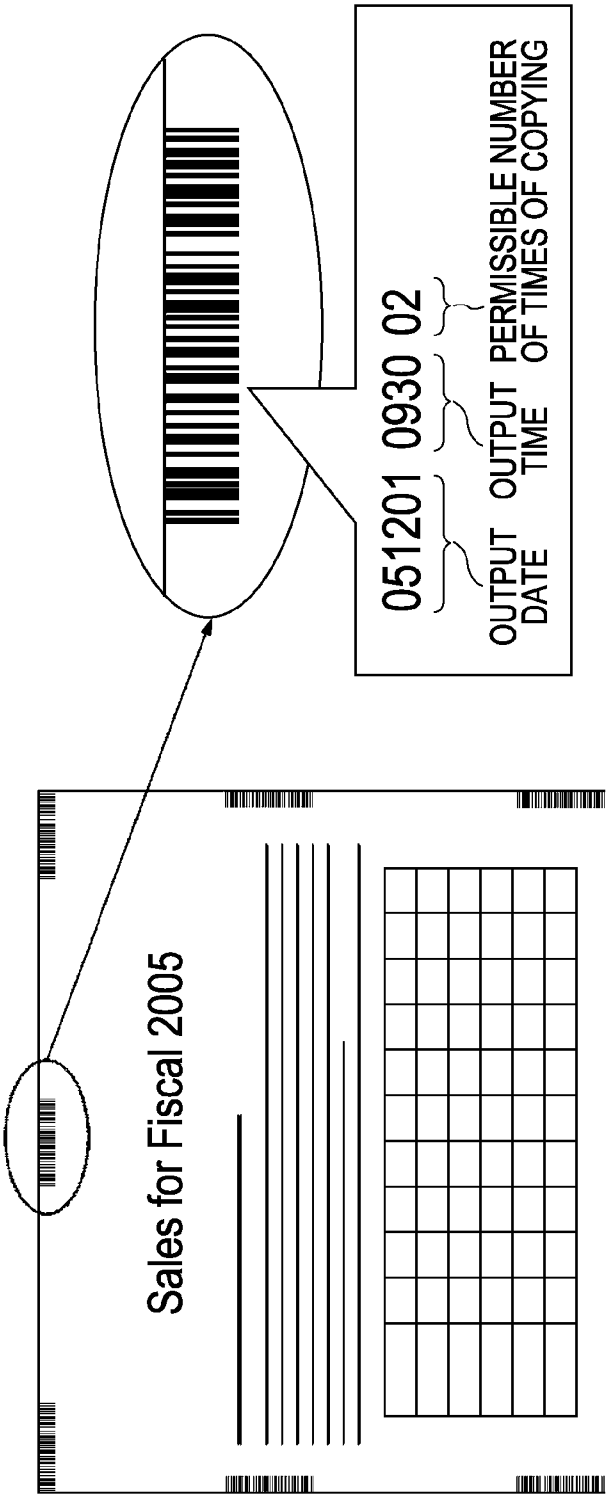
FIG. 6 illustrates an exemplary code mark.
Figure 7:
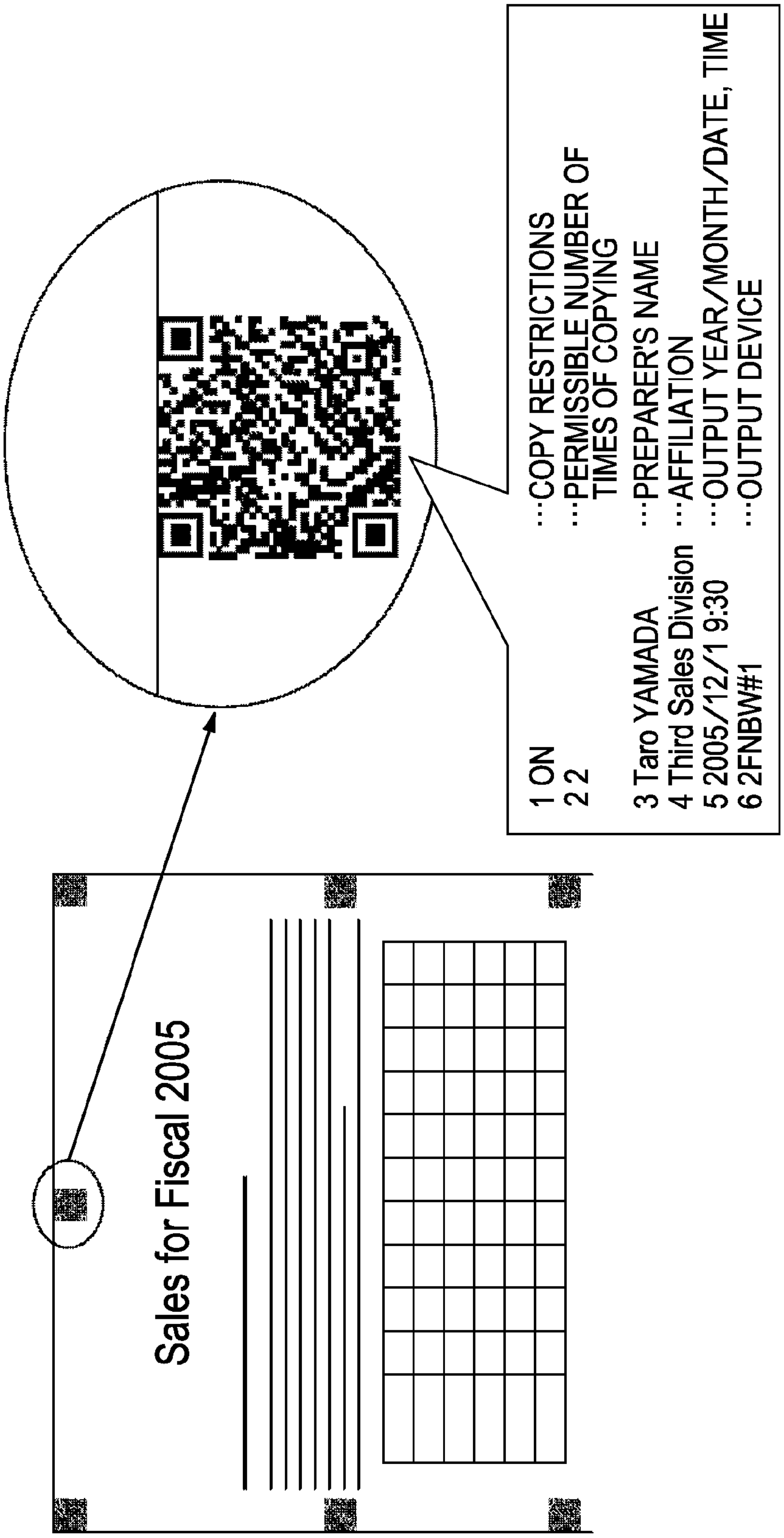
FIG. 7 illustrates another exemplary code mark.

FIG. 6 and FIG. 7 illustrate code marks used in the present exemplary embodiment. FIG. 6 illustrates a one-dimensional barcode which contains information about the date and time of output and the permissible number of times of copying (which is two in this case). FIG. 7 illustrates a two-dimensional barcode which contains information as to whether to place copy restrictions, the permissible number of times of copying, preparer's information, date and time of output, and output device number. The information contained in this two-dimensional barcode indicates that the permissible number of times of copying is two, and that the document is to be output by a black-and-white (BW) printer on the north side of the second floor of the office. As will be seen from the foregoing, a code mark can contain, depending on its type, a large number of items of information as well as the permissible number of times of copying.

Referring back to FIG. 4, after step S1002, the code mark containing copy restriction information encoded by the encoding unit 209 is synthesized by the code synthesizing unit 210 with image data read from the image memory 205 (step S1003). It is desirable that the code mark be added, for example, to the margin on the left, right, top, or bottom of an output sheet (recording medium). Furthermore, if a plurality of code marks are arranged at regular intervals, accuracy in detecting the code marks can be improved. To prevent degradation of an original image caused by adding a code mark, the code mark should be added to a less noticeable area and the code mark should be output in a less noticeable color. For example, if a full color printer is used to output the document, it is desirable that the code mark be formed with brightest color material, such as yellow toner. A colorless toner or colorless ink may also be used. Also, it is possible to place a code mark in the middle of the image using a digital watermark technique. This not only prevents degradation in image quality, but also reduces the possibility that a malicious operator will notice the presence of the code mark.

Next, a copy-forgery-inhibited pattern generated by the copy-forgery-inhibited-pattern generating unit 207 is added by the copy-forgery-inhibited-pattern synthesizing unit 208 to the image output from the code synthesizing unit 210 (step S1004). Then, the image having the copy-forgery-inhibited pattern is transmitted to the printer 112 and recorded on the sheet (step S1005).

The above-described processing performed by the printer driver 211 is performed by a computer-executable program. This program can be installed on a computer from a storage medium, such as a compact disk read only memory (CD-ROM), or can be downloaded from the Internet and installed on a computer.

The code mark and copy-forgery-inhibited pattern may be added to a document scanned by the scanner 111, instead of being added to a document created on the PC. In this case, before scanning the document, a mode for adding copy restriction information to the document is set through the operation unit 202. At the same time, settings similar to those specified on the above-described screen of the printer driver 211 are made.

Next, there will be described a process of making a copy of a document created according to the above-described configuration and provided with copy restriction information.

A document image scanned by the scanner 111 is transmitted to the decoding unit 204 while being stored in the image memory 205. The decoding unit 204 detects whether the scanned document image includes a code mark. If a code mark is detected, the decoding unit 204 reads the copy restriction information contained in the code mark and outputs the read copy restriction information to the control unit 201. According to the read information about the permissible number of times of copying, the control unit 201 modifies a digital filter to be used in the filtering unit 206 and updates the permissible number of times of copying. Next, the document image data is subjected to digital filtering in the filtering unit 206, synthesized with the code mark in the code synthesizing unit 210, given a copy-forgery-inhibited pattern in the copy-forgery-inhibited-pattern synthesizing unit 208, and transmitted to the printer 112. Then, an image containing the code mark and copy-forgery-inhibited pattern is recorded on a sheet.

Next, this copy operation will be described in detail with reference to the flowchart of FIG. 8. The control unit 201 of FIG. 2 performs processes in this flowchart.

When the user makes a copy of a document on which a code mark formed by encoding information about the permissible number of times of copying is printed, the control unit 201 causes in step S1401 the scanner 111 to scan the document to be copied. In step S1402, the control unit 201 determines whether the code mark has been detected. If the code mark has not been detected (NO in step S1402), the process proceeds to step S1410, where the document is copied as a normal document. If it is determined that the code mark has been detected (YES in step S1402), the process proceeds to step S1403, where the control unit 201 causes the decoding unit 204 to decode the code mark printed on the document and obtains the permissible number of times of copying "n" included in the decoded information. The process proceeds to step S1404, where the control unit 201 determines whether the permissible number of times of copying "n" is greater than 0. If n>0 (YES in step S1404), it is determined that the copy operation to be performed is within the maximum number of times of copying permitted for the document. The process then proceeds to step S1405, where the control unit 201 causes the filtering unit 206 to remove the copy-forgery-inhibited pattern using a digital filter.

A digital filter will be described in detail here. A digital filter is typically capable of removing or extracting specific frequency components from image signals, thus sharpening or smoothing images. For application to a copy-forgery-inhibited pattern, a digital filter is configured typically such that when digital filtering is applied to a copy-forgery-inhibited pattern so as to create a large difference between the amplification factor of a background and that of a latent image, the background disappears and only the latent image remains. In the present exemplary embodiment, as described above, the background and latent image of the copy-forgery-inhibited pattern printed on the original document have patterns having predetermined coefficients and designed specifically for use in the copy-forgery-inhibited pattern. Based on this characteristic, the digital filter is configured such that when the permissible number of times of copying is greater than zero (n>0), a frequency and amplification factor are set to values that allow both the background and latent image to be smoothed out. Thus, the copy-forgery-inhibited pattern in which there is no difference between the background and latent image is made less noticeable by performing downstream image adjustment, such as density adjustment or ground dispersion. In other words, the copy-forgery-inhibited pattern is removed. Therefore, when copying is permitted, a copy-forgery-inhibited pattern is not highlighted in the resulting copy.

Referring back to FIG. 8, in step S1406, the control unit 201 subtracts one from the permissible number of times of copying "n". The process then proceeds to step S1407, where the control unit 201 causes the encoding unit 209 to encode the data of the resulting permissible number of times of copying into a code mark. In step S1408, the control unit 201 causes the code synthesizing unit 210 to synthesize the resulting code mark with the image from which the copy-forgery-inhibited pattern has been removed. Then, in step S1409, the control unit 201 causes the copy-forgery-inhibited-pattern synthesizing unit 208 to synthesize a copy-forgery-inhibited pattern newly generated in the copy-forgery-inhibited-pattern generating unit 207 with the image output from the code synthesizing unit 210. The resulting image is transmitted to the printer 112 and output in step S1410.

Figure 9:
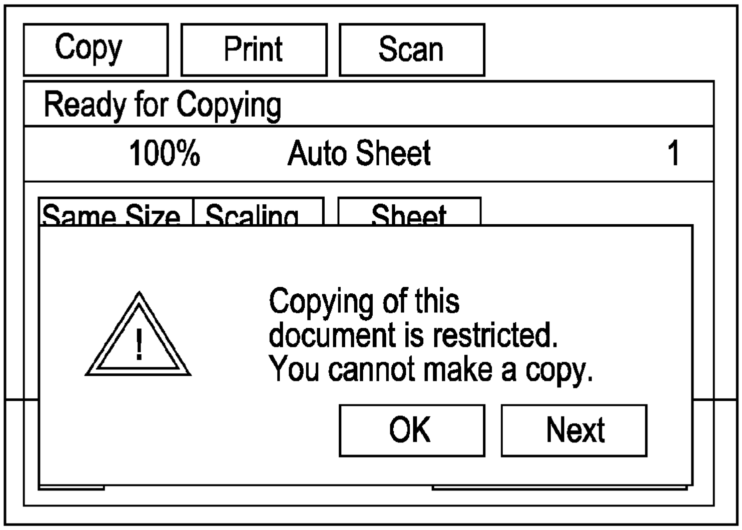
FIG. 9 illustrates an exemplary screen of an operation unit, the screen being displayed when copying is not permitted.

If it is determined in step S1404 that the permissible number of times of copying read from the code mark is zero (n=0, i.e., No in step S1404), the control unit 201 determines that further copying is not permitted. In step S1411, the control unit 201 inhibits copying (i.e., copying is not performed) and displays a warning screen to inform the operator that copying is not allowed. FIG. 9 illustrates an exemplary warning screen.

When it is determined in step S1404 that the permissible number of times of copying is zero (n=0), the control unit 201 may allow copying instead of inhibiting it. That is, if NO in step S1404, the process may proceed to step S1409. In this case, the copy-forgery-inhibited pattern stands out in the copied image, which reveals that a copy-protected document has been copied.

Next, there will be described a case in which a document with a code mark is to be copied by a copying machine which does not support the above-described copy restriction function (e.g., by an old-type machine or a copying machine from a different manufacturer). Since such a copying machine is not capable of detecting a code mark, even if the permissible number of times of copying is greater than zero (n>0), the document is copied as usual. Therefore, a latent image of a copy-forgery-inhibited pattern contained in the document is made visible, which reveals that the resulting copy is a copy of a copy-protected document. This can warn the operator that the document is copy restricted.

As described above, when a document created on a PC or the like is to be output, the setting of copy restrictions and the permissible number of times of copying are specified and added to the document. A function (such as a copy-forgery-inhibited pattern or watermark function) having a copy-protection effect is also added to the document, which is then output. When the output document is to be copied, it is possible to determine whether copying is permitted and to restrict copying, according to the added information about the permissible number of times of copying. Even when a copying machine which does not support the copy restriction function is used, it is possible to achieve copy protection with a copy-forgery-inhibited pattern or watermark having a copy-protection effect. Thus, not only in a limited operating environment but also in various operating environments, it is possible to provide flexible copy protection and thus to prevent the spread of confidential information.

In the exemplary embodiment described above, the setting of copy restrictions and the permissible number of times of copying that are specified when a created document is to be output cannot be changed later, even by a person who prepared the document. Therefore, if it becomes necessary to distribute copies to additional people or the original is lost later, it may not be easy to deal with the situation.

Another exemplary embodiment is configured such that if it is recognized that the user is the preparer of a document or an authorized user, the specified setting of copy restrictions or the permissible number of times of copying can be changed when the document is to be copied.

A configuration of the exemplary embodiment will now be described in detail.

As in the case of the above-described exemplary embodiment, when a document is to be output, the preparer of the document can place copy restrictions, specify the permissible number of times of copying, and set a password through the printer driver 211 on the PC.

Figure 10:
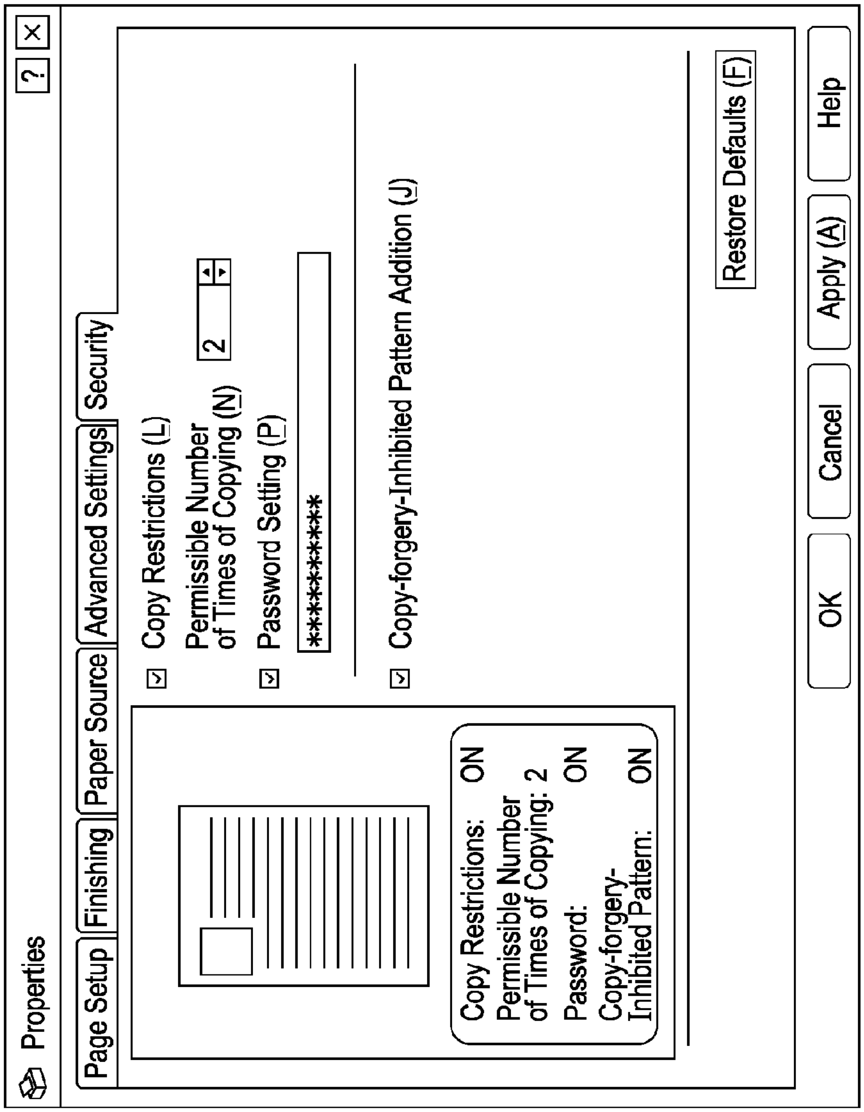
FIG. 10 illustrates an exemplary screen of a printer driver.

FIG. 10 illustrates an exemplary screen of the printer driver 211 according to the present exemplary embodiment. Through this screen, the user (administrator) can place copy restrictions, specify the permissible number of times of copying, add a copy-forgery-inhibited pattern, and set a password. Since password information as well as the permissible number of times of copying and the like are included in a code mark of the present exemplary embodiment, it is desirable that the code mark be a two-dimensional barcode or the like having a large amount of information. Except for setting a password, the configuration of the exemplary embodiment for outputting a document is similar to that of the above-described exemplary embodiment.

Figure 11:
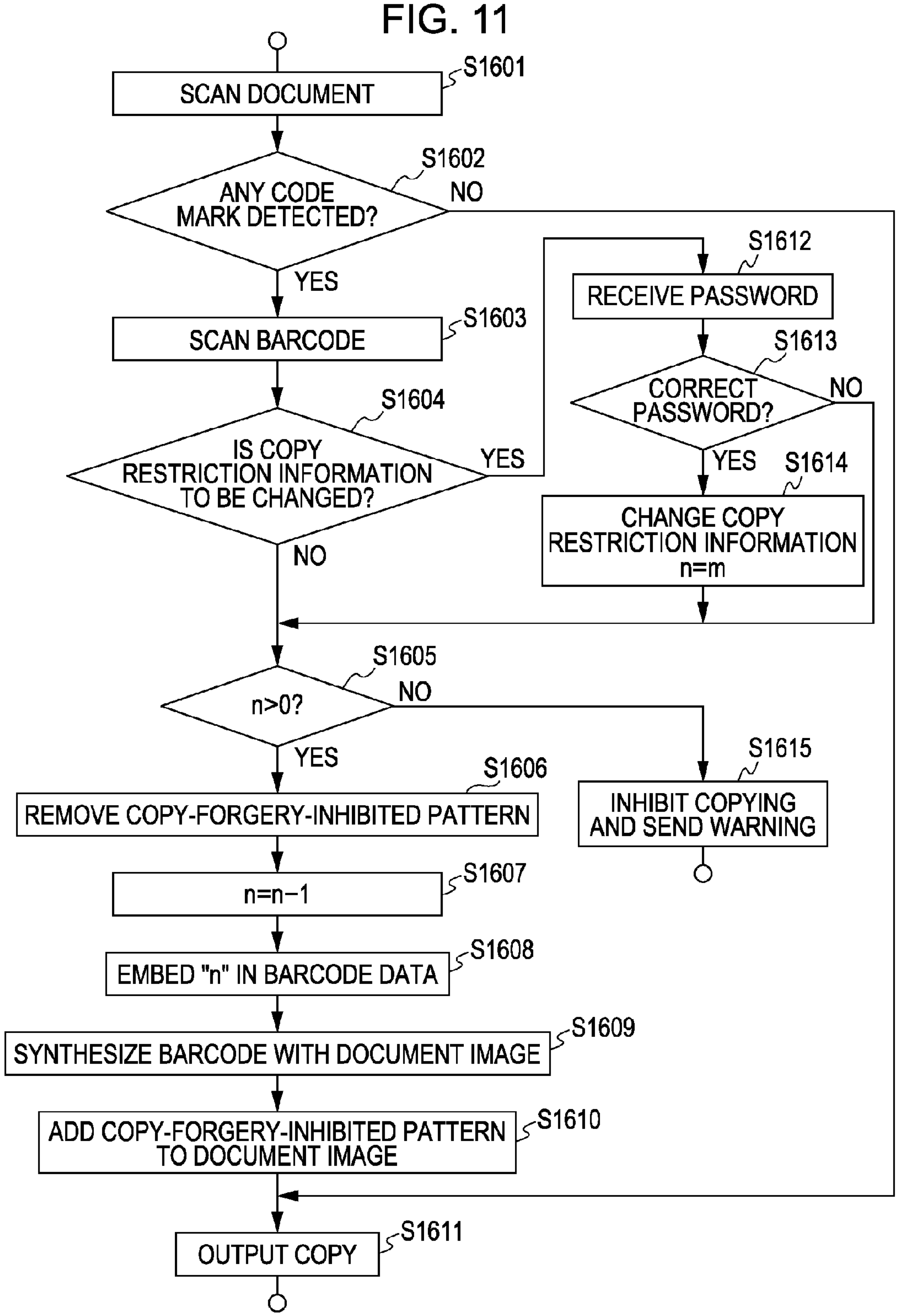
FIG. 11 is a flowchart illustrating an exemplary copying process.

FIG. 11 is a flowchart illustrating an exemplary process of making a copy of a document according to the present exemplary embodiment. The control unit 201 of FIG. 2 performs processes in this flowchart.

Figure 8:
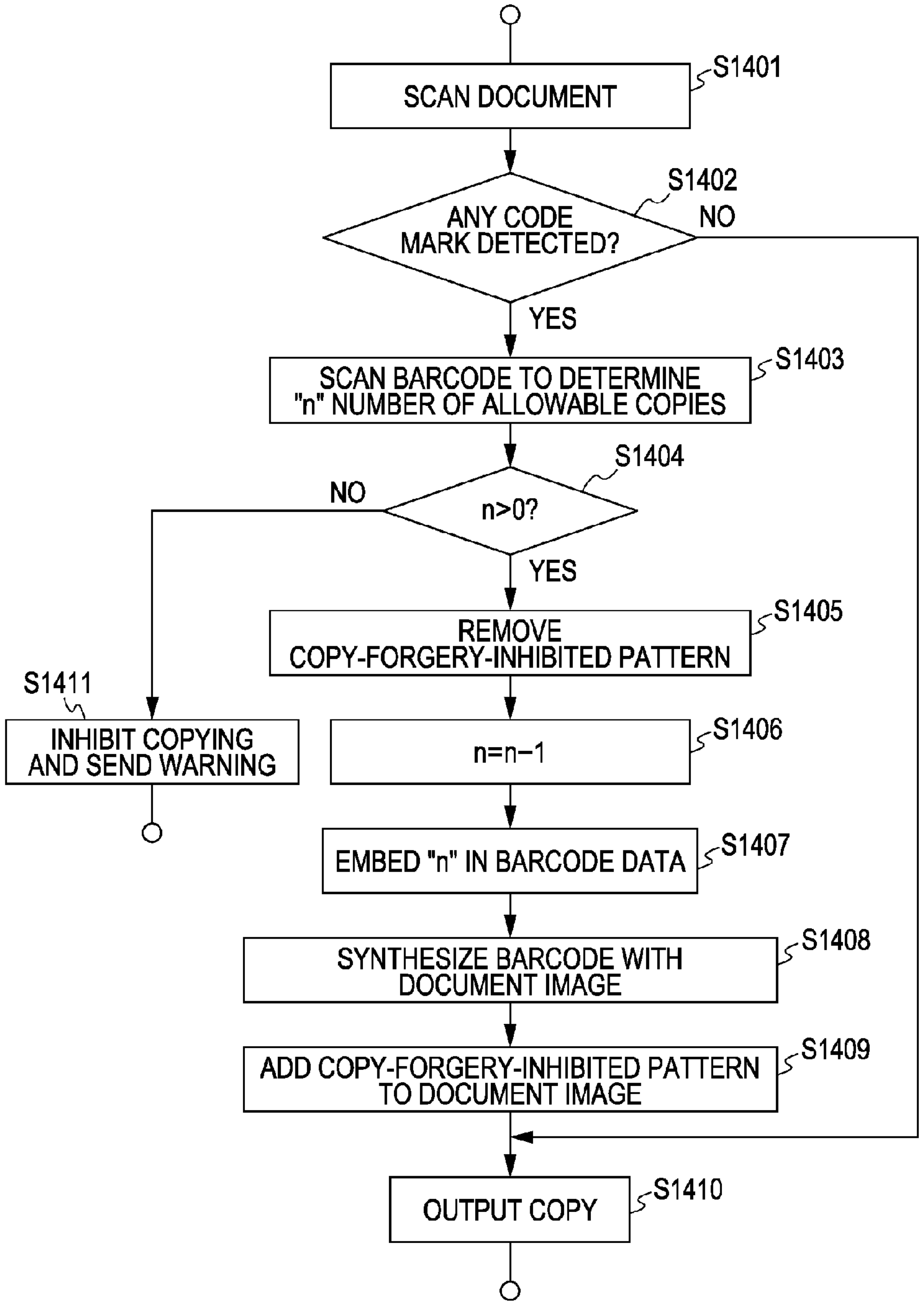
FIG. 8 is a flowchart illustrating an exemplary process of making a copy of a document with copy restriction information.

Processes in steps S1601 to S1603 of the present exemplary embodiment are the same as those in steps S1401 to S1403 of FIG. 8 of the above-described exemplary embodiment.

In step S1603, a code mark printed on a document is detected. The control unit 201 causes the decoding unit 204 to decode the detected code mark to obtain information about the permissible number of times of copying "n" and the password set when the document was created, and stores the obtained information in a random-access memory (RAM) of the control unit 201.

Next, in step S1604, the control unit 201 determines whether the setting of copy restrictions and the permissible number of times of copying are to be changed. If they are not to be changed (NO in step S1604), processing proceeds to step S1605. On the other hand, if they are to be changed (YES in step S1604), processes in steps S1612 to S1614 are performed.

Figure 12:
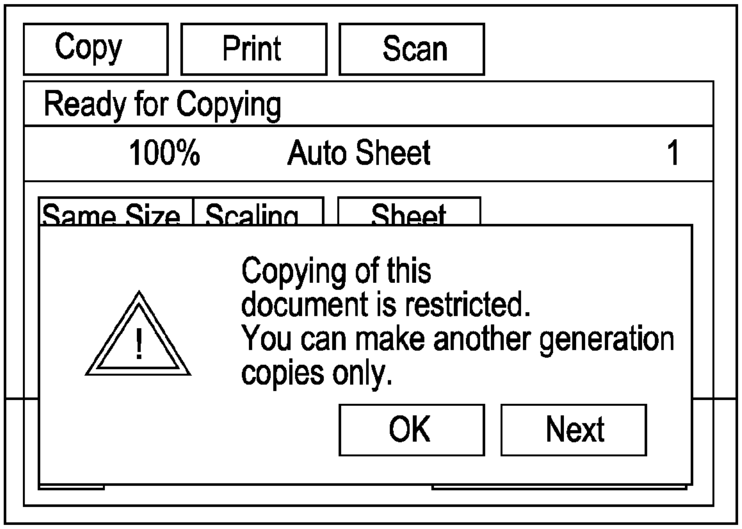
FIG. 12 illustrates an exemplary screen of the operation unit, the screen being displayed when copying is restricted.
Figure 13:
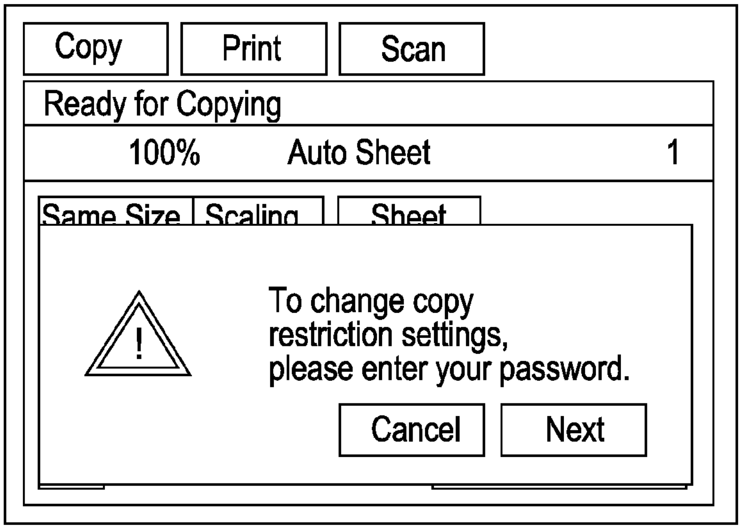
FIG. 13 illustrates another exemplary screen of the operation unit, the screen being displayed when copying is restricted.
Figure 14:
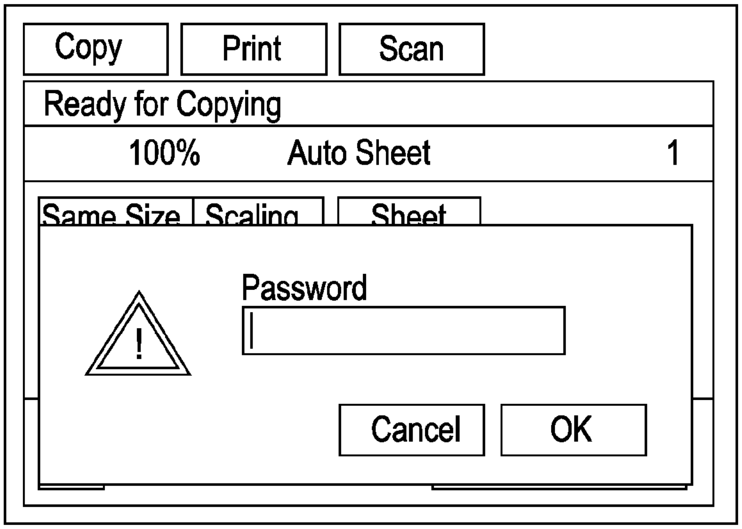
FIG. 14 illustrates another exemplary screen of the operation unit, the screen being displayed when copying is restricted.
Figure 15:
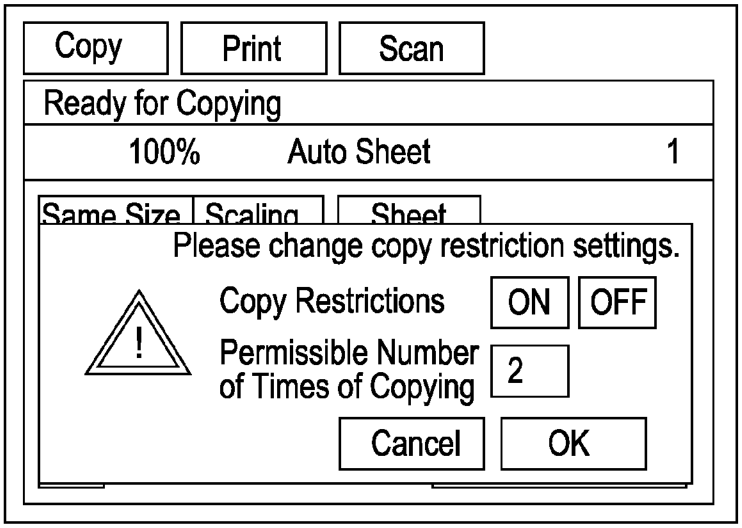
FIG. 15 illustrates another exemplary screen of the operation unit, the screen being displayed when copying is restricted.
Figure 16:
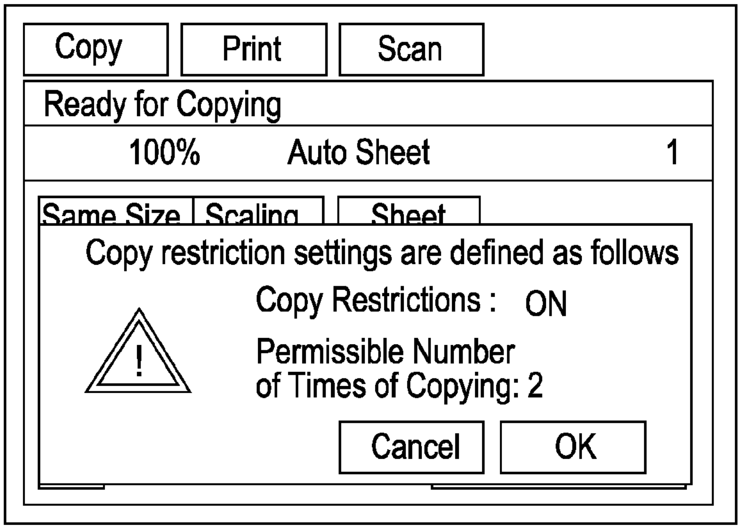
FIG. 16 illustrates another exemplary screen of the operation unit, the screen being displayed when copying is restricted.
Figure 17:
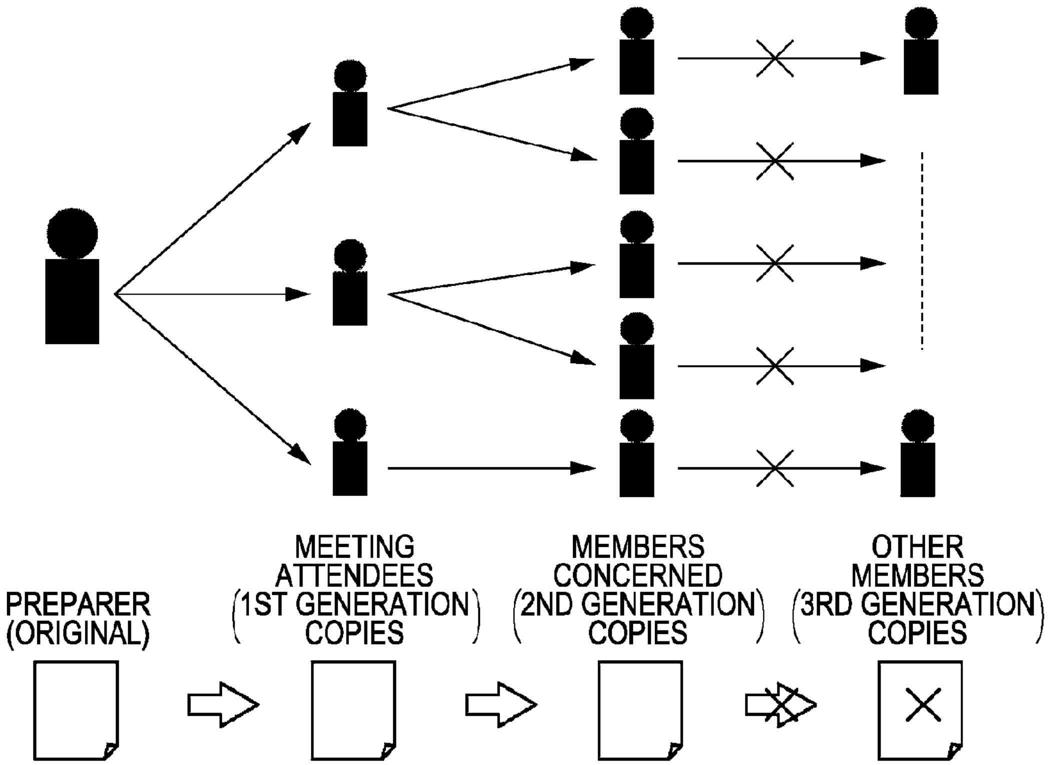
FIG. 17 illustrates an exemplary concept of copy restrictions.
Figure 18:
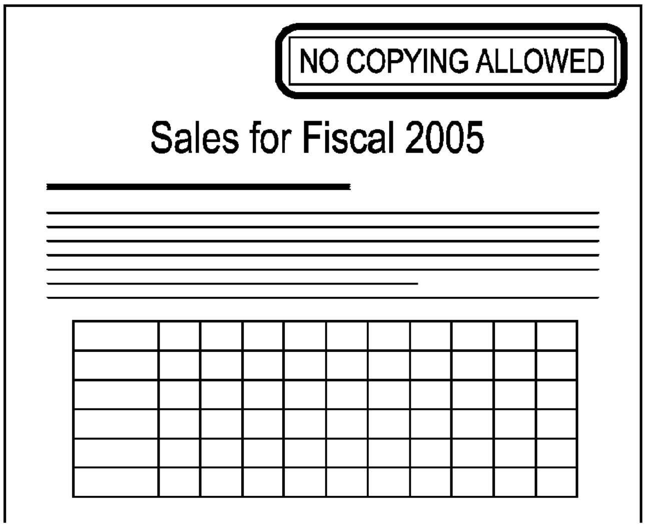
FIG. 18 illustrates a conventional copy-protected document.
Figure 19:
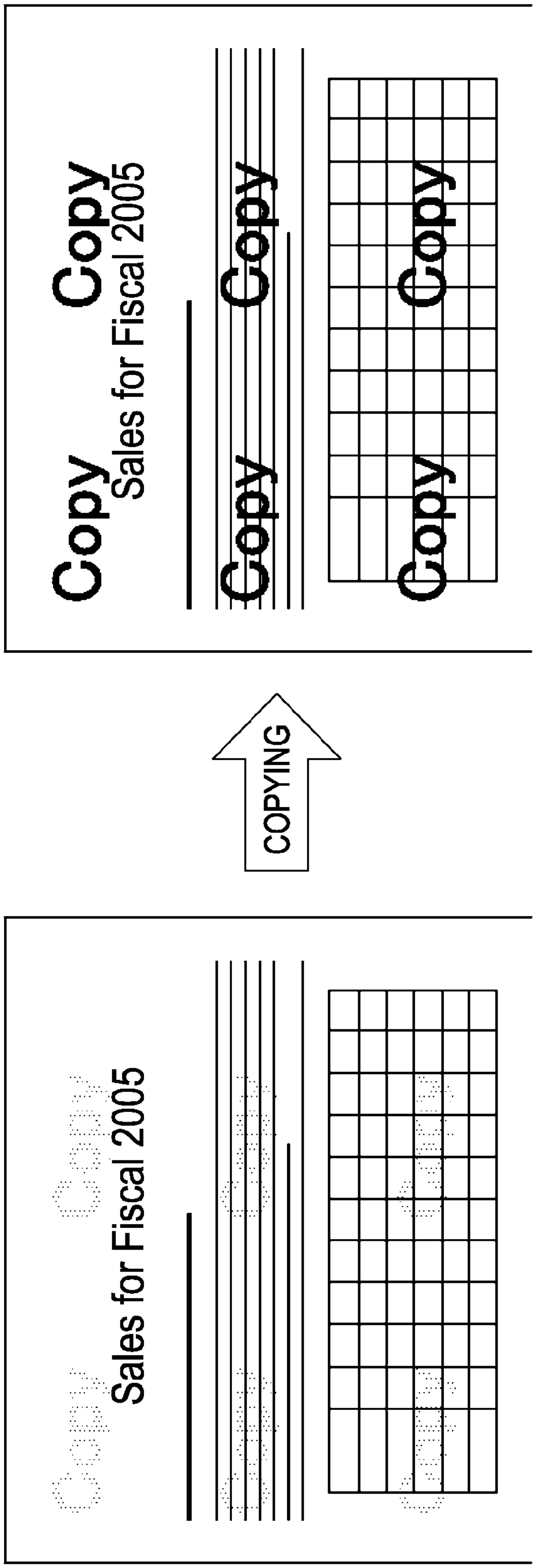
FIG. 19 illustrates copying of a conventional copy-protected document.
Figure 20:
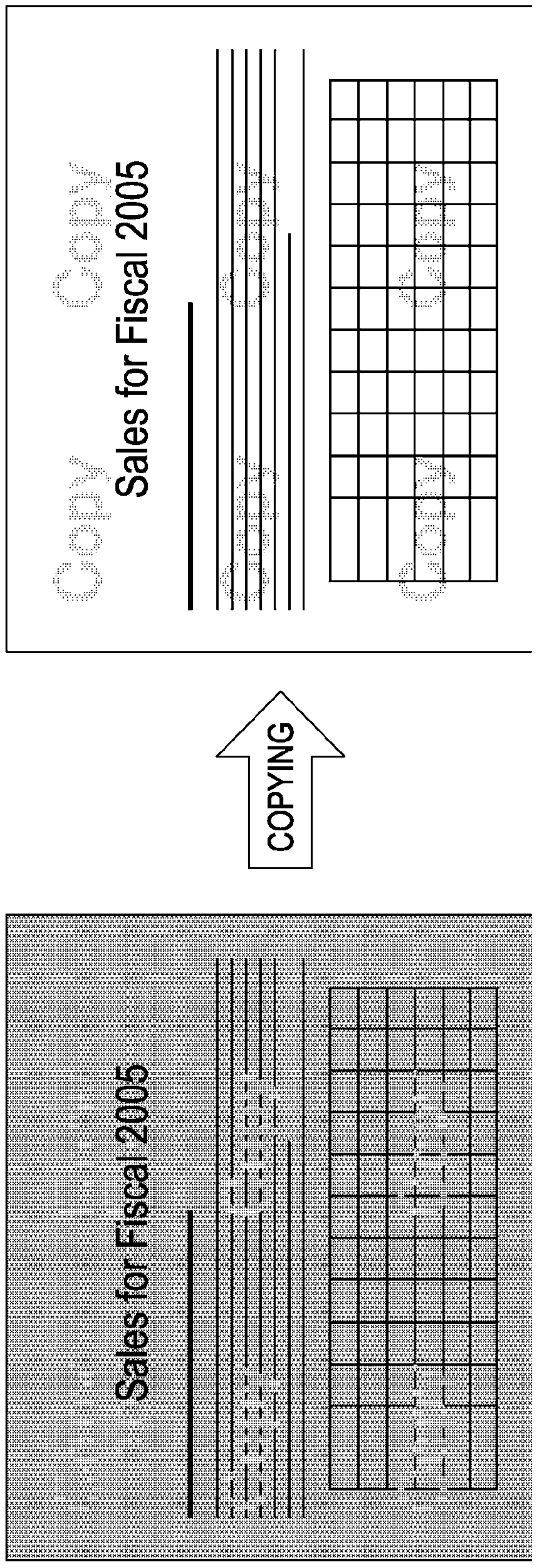
FIG. 20 illustrates copying of another conventional copy-protected document.

Specifically, as illustrated in FIG. 12, a message indicating the presence of copy restrictions placed on the document and the remaining number of times of copying permitted for the document is displayed in the operation unit 202. When "NEXT" button of FIG. 12 is pressed, a screen of FIG. 13 appears to display a message indicating that it is possible to update the setting of copy restrictions and the permissible number of times of copying. As illustrated, only an operator (or administrator) with authority to change these copy restriction settings can update the settings. If the operator wishes to update the settings and presses "NEXT" button of FIG. 13, a screen of FIG. 14 appears to prompt the operator to enter a password. When the operator enters a password from the operation unit 202 and presses "OK" button of FIG. 14 (step S1612), the control unit 201 determines whether the entered password is correct (step S1613). If the entered password is not correct (NO in step S1613), processing proceeds to step S1605. If the entered password is correct (YES in step S1613), the control unit 201 causes the operation unit 202 to display a screen for changing the setting of copy restrictions and the permissible number of times of copying, as illustrated in FIG. 15. When the operator enters values from the operation unit 202 and presses "OK" of FIG. 15, these copy restriction settings are updated (step S1614). Then, the updated settings are displayed as illustrated in FIG. 16. Processing then proceeds to step S1605.

Processes in step S1605 and its subsequent steps of FIG. 11 are the same as those in step S1404 and its subsequent steps of FIG. 8 and described above.

If it is determined in step S1605 of FIG. 11 that the permissible number of times of copying is zero (n=0), the process may proceed to step S1611 as in the case of the above-described exemplary embodiment.

In the foregoing description, a preparer of a document sets a password when creating a document. Then, when a copy of the created document is to be made, copy restriction information can be changed by entering the password. However, a key for permitting the change of copy restriction information may not necessarily be a password. For example, the key may be a user ID or affiliation code for the preparer of the document. If a plurality of users are to be given authority to change the copy restriction information, it is desirable that a key which is common to a plurality of users be used. An example of such a key is an affiliation code.

With the configuration of the present exemplary embodiment described above, by including a key (such as a password) for changing the settings of copy restrictions in a code mark when a document is created, an authorized user can change the settings of copy restrictions when making a copy of the document. Thus, it is possible to provide flexible copy protection in various operating environments and to prevent the spread of confidential information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-174141 filed Jun. 23, 2006, which is hereby incorporated by reference herein in its entirety.

What is claimed is:

1. A method for controlling an image forming apparatus, comprising:

reading an original image to which a copy-forgery-inhibited pattern and copy restriction information are added, the copy-forgery-inhibited pattern including a latent-image part and background-image part, the copy-forgery-inhibited pattern not being used in order that the image forming apparatus restricts a number of times of generation copy, when the copy-forgery-inhibited pattern is copied, the latent-image part in the copy-forgery-inhibited pattern appears in the copied image, the copy restriction information being used in order that the image forming apparatus restricts the number of times of generation copy;

analyzing the copy restriction information read from the original image;

generating an image in which the copy-forgery-inhibited pattern is removed from the original image in a case where the copy restriction information indicates that next generation copy is allowed;

updating the number of times of copying contained in the copy restriction information;

generating copy-forgery-inhibited pattern image data representing a copy-forgery-inhibited pattern; and forming, on a sheet, an image in which the copy restriction information updated and the copy-forgery-inhibited pattern image data generated are added to the original image from which the copy-forgery-inhibited pattern has been removed.

2. The method according to claim 1, wherein a predetermined value is subtracted from a permissible number of times of copying contained in the copy restriction information.

3. The method according to claim 1, wherein when the original image does not contain copy restriction information, an image in which the copy-forgery-inhibited pattern is removed from the original image is not generated.

4. The method according to claim 1, further comprising permitting an operator to manually set an update value for updating the copy restriction information.

5. The method according to claim 1, further comprising encoding the updated copy restriction information, wherein the encoded copy restriction information is added to the original image from which the copy-forgery-inhibited pattern has been removed.

6. An image forming apparatus comprising:

a reading device configured to read an original image to which a copy-forgery-inhibited pattern and copy restriction information are added, the copy-forgery-inhibited pattern including a latent-image part and background-image part, the copy-forgery-inhibited pattern not being used in order that the image forming apparatus restricts a number of times of generation copy, when the copy-forgery-inhibited pattern is copied, the latent-image part in the copy-forgery-inhibited pattern appears in the copied image;

an analyzing unit configured to analyze the copy restriction information added to the original image read by the reading device;

a first generating unit configured to generate an image in which the copy-forgery-inhibited pattern is removed from the original image read by the reading device in a case where the copy restriction information analyzed by the analyzing unit indicates that next generation copy is allowed;

an updating unit which updates the number of times of copying contained in the copy restriction information determined by the determining unit;

a second generating unit configured to generate copy-forgery-inhibited pattern image data representing a copy-forgery-inhibited pattern; and a forming unit configured to form, on a sheet, an image in which the copy restriction information updated and the copy-forgery-inhibited pattern image data generated are added to the original image from which the copy-forgery-inhibited pattern has been removed.

* * * * *